March 24, 1959 R. W. SONNENFELDT 2,879,327

COLOR TELEVISION SYNCHRONIZING CIRCUITS

Filed May 14, 1954

2 Sheets-Sheet 1

INVENTOR.
RICHARD W. SONNENFELDT

BY [signature]

ATTORNEY

March 24, 1959 R. W. SONNENFELDT 2,879,327

COLOR TELEVISION SYNCHRONIZING CIRCUITS

Filed May 14, 1954 2 Sheets-Sheet 2

INVENTOR.
RICHARD W. SONNENFELDT
BY [signature]
ATTORNEY

United States Patent Office 2,879,327

Patented Mar. 24, 1959

2,879,327

COLOR TELEVISION SYNCHRONIZING CIRCUITS

Richard W. Sonnenfeldt, Haddonfield, N.J., assignor to Radio Corporation of America, a corporation of Delaware Application May 14, 1954, Serial No. 429,815

14 Claims. (Cl. 178—5.4)

The present invention relates to synchronizing and phase discriminator circuits and in particular to combined burst separator, phase discriminator and frequency controlled color oscillator circuits for use in color television.

Color television is the reproduction on the viewing screen of a receiver of not only the relative luminance or brightness but also the color hues and saturations of the details in the original scene. Complete coherence is absolutely essential between the transmitter and the receiver. As a result, much emphasis is placed on the development and utilization of efficient transmission and synchronizing methods. The present invention is intended as a major step forward in the art of not only improved synchronizing circuitry but also with the purpose of simplifying such circuitry and achieving a vast reduction in the amount of circuit components involved.

Before entering into the description and the specification describing the present invention, consider first the nature of the color television signal and the type of synchronism which must be achieved in the color television receiver.

The color television signal contains several different types of information. One is the luminance or brightness information. The brightness information is produced by cross mixing red, blue and green primary signals to produce a monochrome signal according to the equation $$Y = .30R + .59G + .11B \qquad (1)$$

By combining the outputs of primary color cameras according to these proportions a typical white matching daylight is produced. This signal is generated in accordance with existing scanning standards namely 525 lines at 60 fields per second and 30 frames per second and is treated exactly like a standard monochrome signal with respect to bandwidth and the addition of synchronizing and blanking pulses. When this particular portion of the color television signal is received even by a monochrome receiver the monochrome version of the signal is reconstructed. When received by a color television receiver if no color information is present this signal will present a monochrome image on the color television receiver; if color information is present this signal will supply the fine detail of the color image.

The color information is transmitted in the form of what is known as chrominance or color difference signals. It would be suitable to transmit signals of the type $R-Y$, $B-Y$ and $G-Y$; in fact only two of these signals would have to be transmitted since color difference signals are so inter-related that once any two signals are known the third can be produced by cross mixing. The $R-Y$, $B-Y$ and $G-Y$ signals are actually color difference signals. They represent the chrominance of the scene whose brightness information is transmitted in the Y portion of the signal. Actually in order to take advantage of the acuity of the eye two other color difference signals namely an I signal and a Q signal are formed. The I signal is a wide band signal having color information along principally tthe orange-cyan axis and the Q signal is a relatively narrow band color signal describing information along substantially a green-purple axis.

Once the I and Q signals are formed the problem arises of the most suitable method of including them in the color television signal. The problem has been uniquely solved by utilizing a modulated color subcarrier. This is accomplished by choosing a color subcarrier frequency and then by modulating one color subcarrier at this frequency with the I signal and modulating a second color subcarrier with the Q signal, this second subcarrier having the same frequency but 90° out of phase with respect to the subcarrier used for the I signal. The two modulated subcarriers are combined in a common transmission channel to form a modulated color subcarrier. At the receiver the color information represented by the I and Q signals may be recovered by the processes of synchronous detection; synchronous detection is accomplished by beating the modulated color subcarrier with a locally produced reference signal having the same frequency as the color subcarrier but with the phase associated with the particular color difference to be demodulated. It is interesting to note that the inclusion of the I and Q signals into the color subcarrier actually sets up a condition whereby a multiplicity of colors are included in the color subcarrier, each associated with a particular phase so that though the I and Q signals may be synchronously demodulated, each using a reference signal having corresponding phase, it is possible by using reference signals of other phases to obtain purple, red, blue, yellow, green and magenta color difference signals.

It should also be noted here that the modulated color subcarrier signal is caused to be a suppressed subcarrier signal by the use of balanced modulators at the transmitter. This has the additional advantage of more efficient spectrum utilization.

Since, as has been described, the phase of the reference signal in the color television receiver must be accurately evolved for synchronous detection of the particular color difference signals or color signals to be demodulated, it is evident that means for color synchronization must also be included in the color television signal. The frequency of the color subcarrier is approximately 3.58 megacycles. The color synchronization is accomplished by transmitting at least eight cycles of this color subcarrier frequency on the back porch of the horizontal synchronizing pulse. The phase of this color synchronizing burst is such that the burst leads the I signal by 57°, the I signal in turn leading the Q signal by 57°. It is interesting to note too that the burst phase leads the blue color difference signal or $B-Y$ signal by exactly 180°, the $B-Y$ signal lagging the red color difference signal or $R-Y$ signal by 90°.

There are many methods of color synchronization in color television receivers which produce one or more reference signals whose phases are accurately determined by the color synchronizing burst. These methods involve, for example, the use of ringing circuits, injection local circuits or reactance tube frequency and phase control circuits. The present invention is not intended to describe a new approach to reference signal synchronizing circuits but rather a unique simplification of what is normally an elaborate and complicated local oscillator, reactance tube, phase discriminator, and burst separator circuit.

It is an object of this invention to combine in one tube circuit, the functions of burst amplifier, burst separator, phase detector and D.-C. amplifier with automatic balance.

It is yet another object of this invention to provide a flyback pulse keyed phase detector.

It is yet another object of this invention to provide a unique method of producing phase detection in a multigrid electron tube.

It is yet another object of this invention to provide in a single tube the combined action of burst amplifier, burst separator, phase detector and D.-C. amplifier, local oscillator and frequency control.

It is yet a further object of this invention to provide a simplified frequency controlled local oscillator for a color television receiver.

It is yet another object of this invention to perform the functions of burst separation, phase comparison, reference signal generation and automatic frequency control in a single circuit in a color television receiver.

It is yet another object and very important aspect of the present invention that the normally complicated and extensive circuits utilized for burst separation automatic frequency control of the local reference signal source in a color television receiver be combined and simplified into a single fast acting and simple circuit.

In one form of the invention a pentagrid converter tube is used to which the video signal is applied to the first grid and the local oscillator signal is applied to the second control grid. A kickback voltage is applied to the plate so that the plate current is drawn only during the duration of the color synchronizing burst. The tube conducts in such a way that the plate current is a function of the phase difference between the synchronizing burst and the local oscillator signal; the system yielding a normal phase discriminator characteristic. The output of the combined burst amplifier separator and phase discriminator may then be passed through a low pass filter to a reactance tube which can be utilized to control the frequency of the local oscillator.

In another form of the invention a pentagrid converter type tube having at least two control grids is utilized. In the circuit consisting of the cathode and the first control grid, an oscillator circuit is instituted which, when combined with the action of the second grid or first screen grid, causes the initial portion of the pentagrid converter tube, regardless of anode potential, to function continuously as a local oscillator. The video signal containing the synchronizing burst is applied to the second control grid, and positive kickback voltage having the duration interval of the color synchronizing burst is applied to the anode of the tube. The tube conducts to the anode only during the kickback voltage and, due to the combined oscillator action and phase discriminator action, a signal appears at the anode which is indicative of the difference in phase between the color synchronizing burst and the oscillating first grid, cathode circuit. By utilizing this phase indicative anode voltage to supply bias to the first control grid, automatic frequency control of the oscillator is thereby achieved. In this version, burst separation, burst amplification, local oscillator action, automatic frequency control and phase comparison are all contained within a simple single tube circuit.

Other objects of this invention will become apparent upon a reading of the following specification and an inspection of the accompanying drawings in which.

Figure 1:
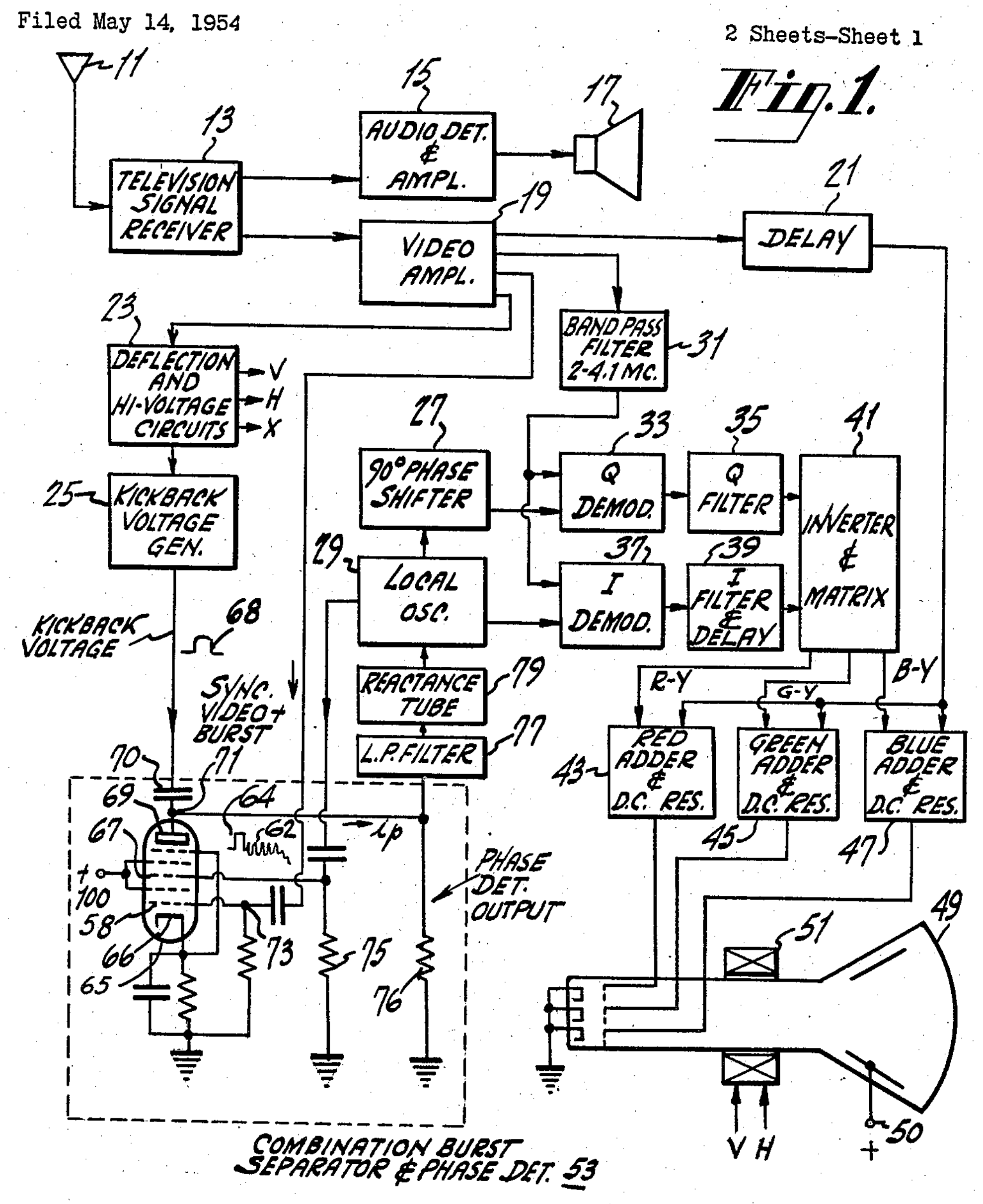
Figure 1 shows a color television receiver utilizing the form of the present invention which involves a combination of the burst separator and phase detector.

Before entering upon a discussion of the forms of the present invention as described in these specifications, consider the operation of the color television receiver shown in Figure 1. Here the color television signal arrives at the antenna 11 and is detected by the television signal receiver 13. The television signal receiver 13 combines the well-known functions of first detection, intermediate frequency amplification, second detection and automatic gain control. These and other aspects which are well-known functions of a television signal receiver are discussed in, for example, the paper by Antony Wright entitled "Television Receivers" in the RCA Review for March 1949. One output branch of the television signal receiver is the sound information branch which, utilizing, for example, the principles of intercarrier sound, delivers the sound information to the audio detector and amplifier 15 where the sound signals are produced, amplified, and supplied to the loud speaker 17. The color television signal is also applied to the video amplifier 19 from whose output the color television signal is provided to at least four branches. One branch feeds the color television signal to the deflection and high voltage circuits 23 which provide the deflection signals to the deflection yokes 51 and also the high voltage to the ultor 50 of the kinescope 49. In addition, the deflection and high voltage circuits 23 may be utilized to provide operation for the kickback voltage generator 25 which supplies a kickback voltage 68, this kickback voltage being adapted to be positive pulse having a duration time substantially that of the color synchronizing burst. The video amplifier also feeds a signal to the delay line 21. From the delay line 21 there issues a properly delayed luminance signal which is applied simultaneously to the red adder and D.-C. restorer 43, the green adder and D.-C. restorer 45, and the blue adder and D.-C. restorer 47.

The output of the video amplifier 19 also supplies a color television signal to the band pass filter 31 which has a band pass of from 2 to 4.1 megacycles which is sufficient to eliminate the luminance information outside of the region of the modulated color subcarrier. The output of the band pass filter 31 is applied simultaneously to the Q demodulator 33 and the I demodulator 37. The video amplifier 19 and the kickback voltage generator 25 provide their respective signals to the combination burst separator and phase detector 53 to which is also applied the output of the local oscillator 29. The combination burst separator and phase detector 53 which is turned on during the color synchronizing burst by the gate or kickback voltage 68, and which compares the phase of the color synchronizing burst with that of the local oscillator 29, yields a signal which is indicative of the difference in phase between the color synchronizing burst and the local oscillator. This signal is passed through the low pass filter 77 which may also be an integrating device and is supplied to the reactance tube 79 which returns the local oscillator 29 to proper frequency and phase as specified by the color synchronizing burst. The local oscillator 29 supplies one signal to the I demodulator 37 and another signal through the 90° phase shifter 27 to the Q demodulator 33. The Q demodulator 33 demodulates the Q information which is passed through the Q filter 35 which has a pass band from substantially 0 to ½ megacycle. The output of the Q filter 35 is impressed on the inverter and matrix circuit 41. The I signal is produced by the I demodulator 37 and is passed through the I filter and delay circuit 39 which has a pass band from substantially 0 to 1½ megacycles. The output of the I filter and delay circuit 39 is also passed to the inverter and matrix circuit 41.

The inverter and matrix 41 supplies $R-Y$, $G-Y$, and $B-Y$ signals respectively, to the red adder and D.-C. restorer 43, the green adder and D.-C. restorer 45 and the blue adder and D.-C. restorer 47 which in turn supply the red, green and blue signals to appropriate control grids of the color kinescope 49.

Returning now to the combination burst separator and phase detector 53, consider the operation of the multigrid electron tube 65. The local oscillator signal from the local oscillator 29 is applied to the third grid 67 to yield a voltage $$e_{g3}=E_3 \sin(\omega t+\theta) \quad (2)$$

The composite color television signal is applied to the first control grid 58 to supply during burst time, a signal of the form $$e_{g1}=E_1 \sin \omega t \quad (3)$$

The composite signal includes the horizontal synchronizing pulse 64 and the color synchronizing burst 62. An appropriate positive potential is applied to the other grids of multi-grid electron tube 65.

If the anode is not raised to a suitable positive potential, no signal will appear in the anode circuit which consists of the resistance 76 which is connected directly from anode to ground. In the operation of the present invention, a positive kickback voltage 68 is applied through the capacitor 70 to the anode terminal 71. This kickback voltage has substantially the duration of the synchronizing burst 62 and serves to drive the anode 69 positive during this time. This action has the effect of providing both a burst gate action and also burst amplification since amplification of the various signals within the tube takes place in addition to the multiplying action of the respective signals which will be seen to contribute to the present invention.

Since the multigrid electron tube 65 acts as a modulator tube, it can be shown from the theory of pentagrid converter tubes and of tubes utilizing a plurality of control grids that the D.-C. current flowing in the plate circuit will have a current component which is substantially of the form $$i_p=KE_1E_3 \cos \theta \quad (4)$$

where K is a proportionality constant and $\theta$ is the phase shift between the color synchronizing burst 62 and the signal from the local oscillator as measured during the color synchronizing burst due to the burst gate action applied to the anode 69. It follows then from Equation 4 that the output current yields a typical discriminator characteristic curve which is a function of phase and which passes through zero when the color synchronizing burst and the local oscillator signal are 90° apart in phase. The characteristic curve is shown in Figure 2 where the curve 76 is seen to decrease as the phase angle $\theta$ increases toward 90° and then passes through it, this type of characteristic is typical of most phase discriminators which utilize unilateral impedances for comparison of the color synchronizing burst and the local oscillator signal.

Figure 2:
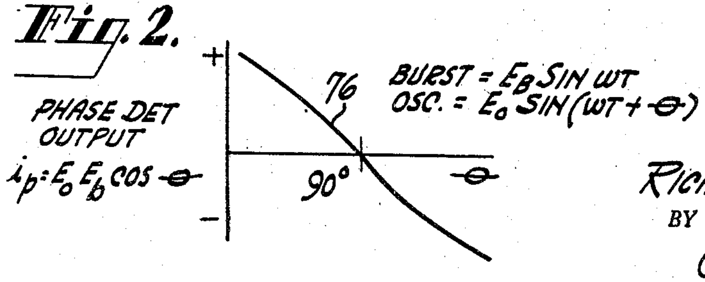
Figure 2 shows the phase comparison characteristic curve produced by the pentagrid converter tube 65 in Figure 1; and, Figure 3 shows another version of the present invention as utilized in a color television receiver which involves a single circuit which combines the function of burst separator, phase detector, reference signal oscillator and automatic frequency control.

A voltage, due to $i_p$, and following from the curve shown in Figure 2 will be developed across the resistance 76. This voltage may be then applied through the low pass filter 77 to convert this voltage, which will have the duration time that of the color synchronizing burst, to a continuous voltage. It is important to note that any properly designed integrating circuit could also perform the function yielded by the low pass filter 77.

The continuous voltage yielded by the low pass filter 77, this voltage being a function of the phase difference, is then applied to the reactance tube 79 which in turn corrects any deviations in phase and frequency which may have occurred in the output signal of the local oscillator.

In the circuit in Figure 1, the reactance tube and the local oscillator were described as separate circuits so that the precise operation of the combination burst separator and burst detector 53 could be explained and highlighted without undue complication. It is important to note, however, that the present invention is actually far more versatile inasmuch as it permits an even greater aggregation of operation in one circuit, this aggregation of operation including not only burst separation, burst amplification and phase detection but also the production of the local oscillator signal and also the automatic frequency control of this local oscillator signal. Such a circuit is shown in Figure 3.

Figure 3:
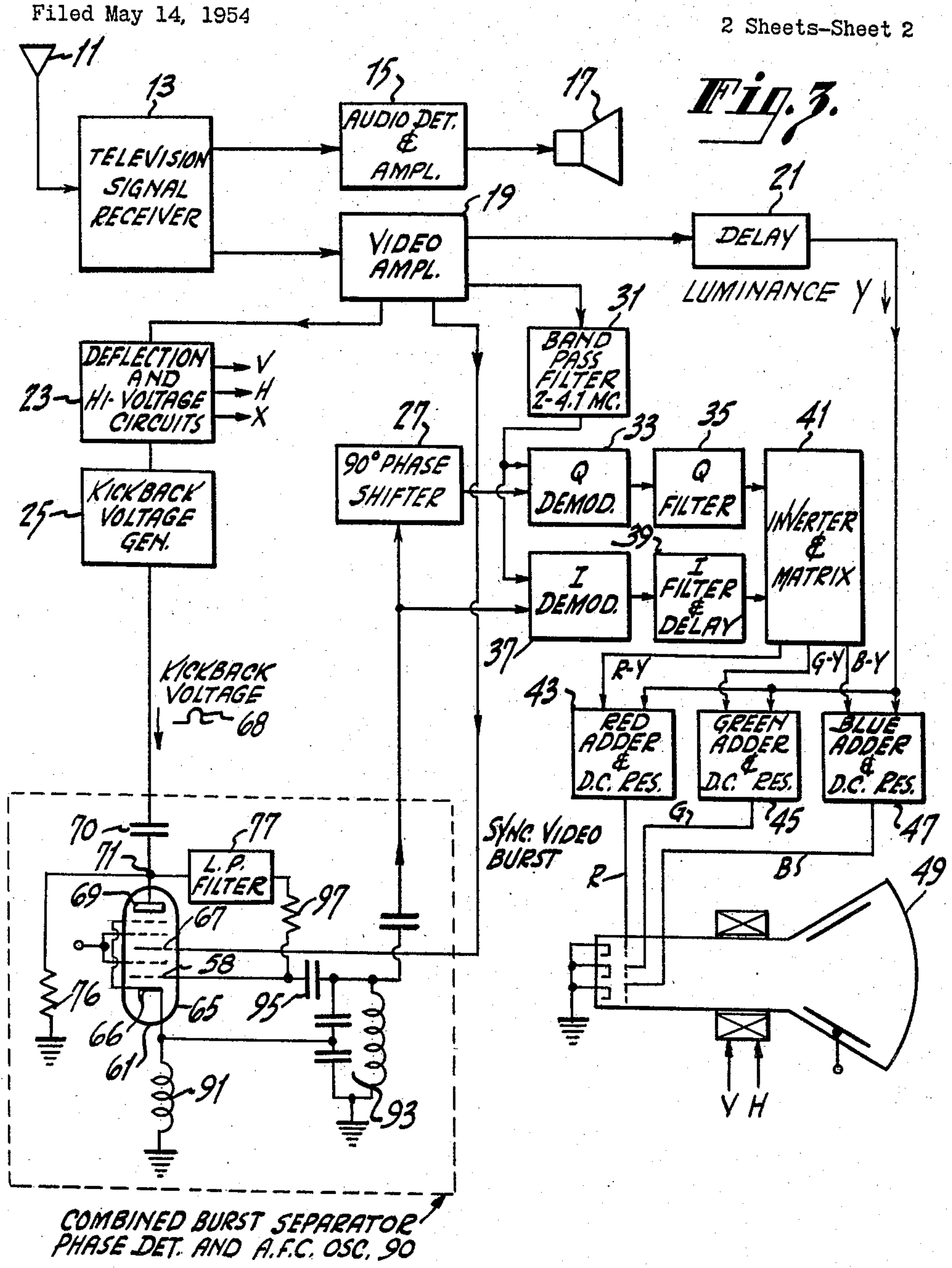

In Figure 3, a Colpitts type of oscillator circuit is installed between the control grid 58 and ground. This Colpitts type circuit includes the resonant circuit 93 which is tuned to the color synchronizing burst and also the by-pass condenser 95. In order to permit oscillator action, the high frequency choke 91 is connected between cathode 66 and ground with the cathode then connected to the midpoint of the serially connected pair of capacitances which are typical of a Colpitts type circuit. By providing a suitable positive potential to the second grid 56, the portion of the multigrid electron tube 65 consisting of the cathode 66, the control grid 58 and the second grid 56 in conjunction with the previously described choke 91, resonant circuit 93 and by-pass condenser 95 can be made to oscillate if a means of grid leak is also provided between the control grid 58 and ground. Assuming for the moment that such grid leak operation can be included, it is seen that the oscillator action thereby provided in the first control grid portion of the multigrid electron tube 65 can be utilized in conjunction with the action of a video signal containing the burst which is applied to the second control grid 67 and the positive kickback voltage 68 which is applied to the anode 69, these combined actions yielding a voltage across the resistance 76 which is a function of the deviation in phase between the oscillator signal developed across the resonant circuit 93 and the color synchronizing burst as provided by the video signal. Thus, the oscillator has been combined into the present invention. While the oscillator has been described in terms of a Colpitts oscillator, it follows to one skilled in the art that actually one of many types of oscillator circuits, including crystal type oscillator circuits, could have been employed.

Though a separate reactance tube can be utilized to control the frequency of the oscillator circuit which is installed into the cathode, first grid and second grid portions of the multigrid electron tube 65, it is yet another outstanding contribution of the present invention that automatic frequency control can also be included in the accomplishments of the multi-purpose combined burst separator, phase detector and oscillator circuit 90. The frequency of the oscillating circuit can be controlled by varying the bias applied to the first control grid 58. This may have one or more of several effects, namely the variation of the trans-conductance to the second grid 56 or the variation of the electronic conductance presented between the cathode 66 and the control grid 58. It has already been mentioned that provisions must be made in the oscillator circuit for a grid leak from the grid 58 to ground. Since combination of a grid leak and a frequency control voltage is desired in conjunction with the control grid 58 and since at the terminal point 71 a grid leak to ground is already provided, then by connecting a low pass filter 77 in series with a resistor 97 the anode terminal point 71 and the control grid 58, the phase discriminator voltage developed at the anode terminal point 71 during the time of the color synchronizing burst may be converted into a continuous voltage by the low pass filter 77 or by some suitable integrating circuit, and utilized to correct for any deviations in frequency which the oscillating portion of the circuit might experience.

The multigrid electron tube 65 has therefore been seen to combine the operations of burst separation, burst amplification, phase detection, local oscillator source and automatic frequency control. It is seen from Figure 3 that the result of the use of this circuit which employs and embodies the present invention is a reduction in circuit complexity of a color television receiver. It is seen from Figure 3 that the composite signal including the synchronizing signals, the video information and the color synchronizing burst are applied to the third grid 67, With the kickback voltage 68 applied through the capacitor 70 to the anode terminal 71, the output signal developed across the resonant circuit 93 of the combined burst separator, phase detector, and oscillator 90 is then a frequency and phase stabilized signal which can be applied to the appropriate portions of the color television receiver circuit in a manner already described in connection with Figure 2.

An additional aspect of the present invention is embodied in the circuits shown in Figures 1 and 3; if the plate is pulsed by a properly timed flyback or kickback pulse then, as has been shown, plate current can only flow when the burst is present and, consequently, the plate current and any voltage developed by it across a plate load is a measure of the phase angle $\theta$. The high gain is readily obtained in the multigrid electron tube 65 by choosing a high plate resistor. This is possible here because the plate supply voltage is not applied in series with this resistor but in shunt with it. The gain must, of course, be divided by the pulse duty factor since only the D.-C. output is of interest; but a gain of 0.25 volt per degree is readily obtainable. It has been noted that the null point occurs, as in all balanced phase detectors, for a phase angle of $\theta=90°$ and is independent of amplitude. The plate voltage will vary about some negative voltage with respect to ground and is used to control the AFC circuit of the local oscillator in the manner as described.

The preceding discussion has been concerned principally with the case where the phase of the synchronizing burst is initially different from that of the color oscillator with the AFC circuit thereby utilized to bring the color oscillator into correct phase. Should the frequency of the color synchronizing burst differ from the frequency of the color oscillator, the present invention will also pull the frequency of the local color oscillator to the frequency prescribed by the burst in addition to then forcing it to oscillate at the phase prescribed by the burst. The phenomena of pull-in of frequency can be described by considering the fact that the phase detector output voltage in such a case is an alternating voltage at the beat frequency since the phase angle will vary at the beat frequency rate. In consequence, the local oscillator will be frequency modulated. If the system is properly set up, the frequency of the local oscillator has to be the correct one at some instant during the frequency modulation cycle.

Pull-in or frequency synchronization will be affected in the normal manner for such closed loop systems, that is if the closed loop system is properly damped pull-in will be asymptotic. If the local oscillator were initially running at a frequency different from the correct one, a steady correction voltage must exist in the system after pull-in is completed to tune the local oscillator to the correct frequency. This correction voltage can be produced only through the existence of a static phase error in the system. The phasing of the local system will, therefore, differ very slightly from 90 degrees if the local oscillator were initially detuned. The magnitude of the static phase error is a function of the system gain and it can be held easily to be less than 2 degrees by proper design.

Also, the thermal and impulse noise immunity of the circuit embodying the present invention is greater than that of more complicated circuits. This is due to the fact that phase detection and burst separation are keyed by the same pulse. Normally, only burst separation is keyed. An additional improvement results from the fact that thermal noise can produce only an average zero output at the plate because of the inherent automatic balance of this circuit which does not require matching of impedances, drive voltages, and diodes.

Having described the invention, what is claimed is:

1. In a color television receiver, said color television receiver adapted to receive a color television signal, said color television signal including a color synchronizing burst, a burst responsive local oscillator frequency control circuit comprising in combination a gate voltage generator, said gate voltage generator adapted to yield a positive gate voltage, said gate voltage having a duration time substantially that of said color synchronizing burst, a local oscillator, said local oscillator having a frequency substantially that of said color synchronizing burst, a reactance tube circuit, said reactance tube circuit coupled to local oscillator and adapted to provide said frequency and phase control of said local oscillator in response to a control voltage, a pentagrid converter tube, said pentagrid converter tube including a first control grid, a second control grid, with said first control grid and said second control grid shielded from each other, said pentagrid converter tube also including an anode, a cathode, and an output load, a reference potential terminal, means for coupling said output load between said anode and said reference potential terminal, means for coupling said local oscillator to said first control electrode, means for coupling said color television signal to said second control electrode, means for coupling said gate voltage to said anode for causing electron flow to said anode substantially during said gate voltage, means for causing said pentagrid converter tube to develop a phase-discriminator-characteristic voltage across said output load during said gate voltage as a function of the phase and frequency difference between said local oscillator and said color synchronizing burst, a low pass filter, means for coupling said low pass filter between said anode and said reactance tube to provide said control voltage to cause said reactance tube to control the frequency and phase of said local oscillator responsive to said color synchronizing burst, means for utilizing the output of said local oscillator for color selection in said color television receiver.

2. The invention as set forth in claim 1 and wherein said local oscillator signal is applied to said first control grid and said color television signal is applied to said second control grid.

3. The invention as set forth in claim 1 and wherein said output load is a resistor.

4. In a color television receiver, said color television receiver adapted to receive a color television signal, said color television signal including a color synchronizing burst, a burst responsive local oscillator frequency control circuit comprising in combination, a kickback voltage generator, said gate voltage generator adapted to yield a positive gate voltage, said gate voltage having a duration time substantially that of said color synchronizing burst, a local oscillator, said local oscillator having a frequency substantially that of said color synchronizing burst, a reactance tube circuit, said reactance tube circuit coupled to local oscillator and adapted to provide said frequency and phase control of said local oscillator in response to a control voltage, a pentagrid converter tube, said pentagrid converter tube including a first control grid, a second control grid, with said first control grid and said second control grid shielded from each other, said pentagrid converter tube including an anode, a cathode, and an output load, a reference potential terminal, means for coupling said output load between said anode and said reference potential terminal, means for coupling said local oscillator to said first control electrode, means for coupling said color television signal to said second control electrode, means for coupling said gate voltage to said anode for causing electron flow to said anode substantially during said gate voltage, means for causing said pentagrid converter tube to develop a phase-discriminator-characteristic voltage across said output load during said gate voltage as a function of the phase and frequency difference between said local oscillator and said color synchronizing burst, an integrating circuit means for coupling said integrating circuit between said anode and said reactance tube to provide said control voltage to cause said reactance tube to control the frequency and phase of said local oscillator responsive to said color synchronizing burst, means for utilizing the output of said local oscillator for color selection in said color television receiver.

5. In a color television receiver, said color television receiver adapted to receive a color television signal, said color television signal including a color synchronizing burst, a burst responsive local oscillator circuit, comprising in combination a gate voltage generator, including means to develop a positive kickback voltage having a duration time substantially that of said color synchronizing burst, a pentagrid converter tube, said pentagrid converter tube including an anode, a cathode, a first control grid, and a second control grid, an oscillator circuit means for coupling, said oscillator circuit to at least the first control grid of said pentagrid converter tube to develop oscillations having a frequency substantially that of said color synchronizing burst, means for coupling said color television signal to said second control grid, means for applying said gate voltage to said anode to cause electron flow to said anode during the burst duration time to develop a signal at said anode which is indicative of the phase difference between said color synhcronizing burst and the output of said oscillator, a low pass filter, means for coupling said low pass filter between said anode and first control grid to utilize the filtered signal to provide automatic frequency and phase control of said oscillator circuit.

6. The invention as set forth in claim 5 and wherein said low pass filter is caused to function as an integrating circuit.

7. In the invention as set forth in claim 5 and wherein said oscillator circuit consists of a fixed potential terminal, a parallel resonant circuit and a choke, said parallel resonant circuit including an inductance in shunt with two serially connected capacitors, a fixed potential terminal means for connecting said choke between said cathode and said fixed potential terminal, means for connecting said resonant circuit between said first control grid and said fixed potential terminal means for coupling said cathode to the mid-point of said serially connected capacitors of said resonant circuit.

8. The invention as set forth in claim 5 and wherein is included a fixed potential terminal and an output load, means for coupling said output load between said anode and said fixed potential terminal.

9. In a color television receiver, the combination of, a source of a color television signal including a color synchronizing burst; a local oscillator means, a reactance tube, said reactance tube coupled to said local oscillator means for providing frequency and phase control of said oscillator subject to a control voltage, a gate voltage generator to develop a gate voltage having substantially the duration interval of said color synchronizing burst, a phase discriminator electron control device having an electron stream controlled by at least a first control electrode and a second control electrode and collected at an output electrode, means for coupling said local oscillator means to said first control electrode, means for coupling said color television signal to said second control electrode, means for coupling said gate voltage to said output electrode to cause a voltage to be developed at said output electrode which is indicative of the phase difference between said color synchronizing burst and said local oscillator, a low pass filter, means for coupling said low pass filter between said output electrode and said reactance tube to provide a continuous control voltage to said reactance tube to control the frequency and phase of said local oscillator means, and means for utilizing the output of said local oscillator for color selection in said color television receiver.

10. In a color television receiver, the combination of, a source of a color television signal including a color synchronizing burst; a local oscillator, a reactance tube, said reactance tube coupled to said local oscillator for providing frequency and phase control of said oscillator subject to a control voltage, an electron control device having an electron stream controlled by at least a first control electrode and a second control electrode and collected by an output electrode, means for coupling said local oscillator to said first control electrode, means for coupling said color television signal to said second control electrode, means for disabling said electron control device at all times except during the duration of said color synchronizing burst, means for causing said electron control device to develop an intermittent reference signal at said output electrode which is indicative of the phase difference between said color synchronizing burst and said local oscillator, an integrating circuit, means for coupling said integrating circuit between said output electrode and said reactance tube to convert said intermittent reference signal to a continuous control voltage and for utilizing said continuous control voltage to cause said reactance tube to control the frequency and phase of said local oscillator.

11. In a circuit remote from a signal source transmitting first signals including intermittent reference phase signals and wherein locally generated oscillations having a phase and frequency bearing a fixed relationship with respect to said reference phase are developed, the combination of, a circuit to receive said first signals and to therefrom provide said intermittent reference phase signals having a first frequency, a multigrid electron tube, said multigrid electron tube having at least a cathode, an electron stream, a first control grid and a second control grid, and an anode, a resonant circuit, means for coupling said resonant circuit to said first control grid, means for coupling said cathode to said resonant circuit to cause oscillations having nominally said first frequency to be developed across said resonant circuit, means for coupling said reference phase signal circuit to said second control grid, means for causing the interaction in the electron stream due to oscillations developed at said first control grid and to only said intermittent reference signal appearing on said second control grid to develop a voltage at said anode which is indicative of the phase and frequency relationship existing between said reference signal and said oscillations appearing across said resonant circuit, and a frequency and phase control means responsive to said voltage and utilized to control the frequency and phase of oscillations developed in said resonant circuit.

12. The invention as set forth in claim 11 and wherein said resonant circuit consists of an inductance shunted by two serially connected capacitors, means for coupling said cathode to the midpoint of said serially connected capacitors, and said first control grid to an end connection of said inductance.

13. In a color television receiver, said color television receiver adapted to receive a color television signal, said color television signal including a color synchronizing burst; a burst-separation frequency controlled oscillator circuit comprising in combination, a gate voltage generator, said gate voltage generator adapted to yield a positive gate voltage, said gate voltage having a duration time substantially that of said color synchronizing burst, a combined local oscillator and phase detector tube, said local oscillator and phase detector tube including an anode, a first control grid, a second control grid, an oscillator circuit; means for coupling said oscillator circuit to the first control grid of said combined local oscillator and phase detector tube to develop oscillations having a frequency substantially that of said color syncronizing burst, means for coupling said color television signal to said second control grid, means for applying said gate voltage to said anode to provide electron flow to said anode during burst duration time and for causing interactions on the electron stream due to said oscillations and to said color synchronizing bursts to develop a signal at said anode which is indicative of the phase difference between said color synchronizing burst and the output of said oscillator, and a frequency and phase control circuit coupled to said oscillator circuit and responsive to said signal produced at said anode to control the frequency and phase of said oscillations.

14. In a color television receiver, the combination of, a source of a color television signal, said color television signal including a color synchronizing burst; a gate voltage generator including means to develop a positive gate voltage having a duration time substantially that of said color synchronizing burst, an electron flow device including at least a first control electrode, a second control electrode, and a third control electrode, an oscillator circuit including a resonant circuit, means for coupling said oscillator circuit including said resonant circuit to said first control electrode to develop oscillations across said resonant circuit, means for coupling said television signal source to said second control electrode, means for coupling said gate voltage to said third control electrode for providing electron flow to said third control electrode for the duration interval of said color synchronizing burst and for causing said electron flow device to develop an intermittent signal at said third control electrode which is indicative of the phase and frequency difference between said color synchronizing burst and the oscillations developed across said resonant circuit, an integrating circuit, said integrating circuit means responsive to said intermittent signal produced at said third control electrode to develop a substantially continuous signal which is indicative of the frequency and phase difference between said color synchronizing burst and the oscillations developed across said resonant circuit, and means for coupling said continuous signal to said first control electrode to at least control the frequency and phase of said oscillations developed across said resonant circuit.

References Cited in the file of this patent

UNITED STATES PATENTS

| | | |
|---|---|---|
| 2,494,795 | Bradley | Jan. 17, 1950 |
| 2,594,380 | Barton | Apr. 29, 1952 |
| 2,598,370 | Gruen | May 27, 1952 |
| 2,605,425 | Hugenholtz | July 29, 1952 |
| 2,624,006 | Olthuis et al. | Dec. 30, 1952 |
| 2,653,187 | Luck | Sept. 22, 1953 |
| 2,740,046 | Tellier | Mar. 27, 1956 |
| 2,793,347 | Clark | May 21, 1957 |

OTHER REFERENCES

Color TV, Rider Publication, March 1954, pages 141, 142.